(12) United States Patent
Sheng et al.

(10) Patent No.: US 8,188,441 B2
(45) Date of Patent: May 29, 2012

(54) ULTRAVIOLET INTENSITY DETECTING METHOD, FABRICATING DISPLAY APPARATUS METHOD AND DISPLAY APPARATUS USING THE SAME

(75) Inventors: Chi-Hua Sheng, Hsinchu (TW);
Ruei-Liang Luo, Hsinchu (TW);
Chun-Huai Li, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 530 days.

(21) Appl. No.: 12/395,717

(22) Filed: Mar. 2, 2009

(65) Prior Publication Data
US 2009/0294684 A1 Dec. 3, 2009

(30) Foreign Application Priority Data
May 30, 2008 (TW) ................................ 97120279 A

(51) Int. Cl.
*G01J 3/02* (2006.01)
(52) U.S. Cl. .................. 250/370.08; 250/372; 257/443; 345/87; 345/102; 345/175; 345/207
(58) Field of Classification Search .................. 250/372, 250/370.08; 257/431, 443, 444; 345/87, 345/102, 175, 207
See application file for complete search history.

(56) References Cited

U.S. PATENT DOCUMENTS

| | | | |
|---|---|---|---|
| 7,193,241 B2 | 3/2007 | Hayashi et al. | |
| 7,330,668 B2 * | 2/2008 | Heimlicher | 398/202 |
| 2002/0043613 A1 * | 4/2002 | Suzuki et al. | 250/214.1 |
| 2005/0181122 A1 | 8/2005 | Hayashi et al. | |
| 2006/0285035 A1 * | 12/2006 | Tsuchiya et al. | 349/106 |
| 2007/0108389 A1 | 5/2007 | Makela et al. | |
| 2007/0188441 A1 * | 8/2007 | Tanaka et al. | 345/102 |
| 2009/0027319 A1 * | 1/2009 | Chen | 345/87 |
| 2009/0174647 A1 * | 7/2009 | Chen et al. | 345/102 |
| 2010/0044711 A1 * | 2/2010 | Imai | 257/59 |
| 2010/0220077 A1 * | 9/2010 | Fukunaga et al. | 345/175 |

(Continued)

FOREIGN PATENT DOCUMENTS
CN 1310915 8/2001
(Continued)

OTHER PUBLICATIONS

"1st Office Action of China counterpart application", issued on May 8, 2009, p. 1-p. 5.

(Continued)

*Primary Examiner* — David Porta
*Assistant Examiner* — Casey Bryant
(74) *Attorney, Agent, or Firm* — Jianq Chyun IP Office

(57) ABSTRACT

A display apparatus is provided. The display apparatus is used for detecting an ultraviolet (UV) intensity. The display apparatus includes a lower-substrate, an upper-substrate and a processing unit. The lower-substrate includes a first, a second and a third photo sensors for detecting an intensity of the light in a first, a second and a third bands and converting the intensity of the light in the first, the second and the third bands into a first, a second and a third currents respectively, wherein the ranges of the second and the third bands are comprised within the range of the first band. The upper-substrate is disposed opposite to the lower-substrate. The processing unit is coupled to the first, the second and the third photo sensors, for receiving and processing the first, the second and the third currents so as to obtain the UV intensity.

29 Claims, 11 Drawing Sheets

U.S. PATENT DOCUMENTS

2010/0253661 A1* 10/2010 Hashimoto .................. 345/207
2010/0327289 A1* 12/2010 Cho et al. ..................... 257/72

FOREIGN PATENT DOCUMENTS

| | | |
|---|---|---|
| CN | 1828241 | 9/2006 |
| CN | 101086566 A | 12/2007 |
| TW | I263777 | 10/2006 |

OTHER PUBLICATIONS

"Office Action of China Counterpart Application", issued on Apr. 7, 2011, p. 1-p. 4.

"Office Action of Taiwan Counterpart Application", issued on Jan. 2, 2012, p. 1-p. 4.

\* cited by examiner

ULTRAVIOLET INTENSITY DETECTING METHOD, FABRICATING DISPLAY APPARATUS METHOD AND DISPLAY APPARATUS USING THE SAME

CROSS-REFERENCE TO RELATED APPLICATION

This application claims the priority benefit of Taiwan application serial no. 97120279, filed on May 30, 2008. The entirety of the above-mentioned patent application is hereby incorporated by reference herein and made a part of specification.

BACKGROUND OF THE INVENTION

1. Field of the Invention

The present invention relates to a technique for detecting ultraviolet (UV) intensity, more particularly, to a method for detecting UV intensity by using a display apparatus with a display panel and a processing unit.

2. Description of the Related Art

Air pollution is getting more and more serious in recent years as people benefit by the science and technology. The damage of the atmospheric ozonosphere increases gradually, with the result that the UV light of the sun emits to the earth directly, harming the health of the life on the earth. In order to protect human beings from the harm of UV light (for example, cataract and sunburn), an UV index (UVI) is established as a standard reference providing beings against the harm of the UV light by the World Health Organization (WHO), the United Nations Environment Organization (UNEO), and the World Meteorological Organization (WMO), etc.

It should be mentioned that the value of UVI ranging from 0 to 11+ (or above) can be divided into five levels (these levels can be adjusted/changed appropriately according to different zones/areas), wherein a value between 0~2 indicates low UV intensity, a value between 3 and 5 indicates moderate UV intensity, a value between 6 and 7 indicates a high UV intensity, a value between 8 and 10 indicates a very high UV intensity, and a value of 11+ (or above) indicates an extreme UV intensity.

Generally speaking, the UVI value can be obtained through an exclusive UV measuring instrument (for example, an UV intensity meter), or more conveniently, by surfing internet to get the information published by the meteorological observatory. However, not everyone has his/her own UV measuring instrument and it is unavailable to surf internet to get the UVI everywhere outdoors.

SUMMARY OF THE INVENTION

The present invention provides a display apparatus for detecting an ultraviolet (UV) intensity. The display apparatus includes a lower substrate, an upper substrate and a processing unit. The lower substrate includes a first photo sensor, a second photo sensor, and a third photo sensor for detecting an intensity of the light in a first band, a second band, and a third band and converting the intensity of the light in the first band, the second band, and the third band into a first current, a second current, and a third current respectively, wherein the ranges of the second band and the third band are comprised within the range of the first band. The upper substrate is disposed opposite to the lower substrate. The processing unit is coupled to the first photo sensor, the second photo sensor, and the third photo sensor, for receiving and processing the first current, the second current, and the third current so as to obtain the UV intensity.

The present invention also provides a method for detecting an ultraviolet (UV) intensity by using a display apparatus with a display panel and a processing unit, wherein the display panel at least includes a first detection unit, a second detection unit and a third detection unit. The method includes the following steps of detecting an intensity of the light in a first band and converting the intensity of the light in the first band into a first current by the first detection unit; detecting an intensity of the light in a second band and converting the intensity of the light in the second band into a second current by the second detection unit; detecting an intensity of the light in a third band and converting the intensity of the light in the third band into a third current by the third detection unit, wherein the ranges of the second band and the third band are comprised within the range of the first band; and receiving and processing the first, the second, and the third currents by the processing unit so as to obtain the UV intensity.

The present invention also provides a method for fabricating a display apparatus with a display panel to detect an ultraviolet (UV) intensity. The method includes the following steps of disposing a first detection unit on the display panel for detecting an intensity of the light in a first band and converting the intensity of the light in the first band into a first current; disposing a second detection unit on the display panel for detecting an intensity of the light in a second band and converting the intensity of the light in second band into a second current; disposing a third detection unit on the display panel for detecting an intensity of the light in a third band and converting the intensity of the light in the third band into a third current; and coupling a processing unit to the first, the second and the third detection units. The processing unit receives and processes the first, the second and the third currents so as to obtain the UV intensity, and the ranges of the second band and the third band are comprised within the range of the first band.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

The present invention is to provide a technique which allows any display apparatus associated with a display panel to detect the ultraviolet (UV) index (UVI, i.e., the UV intensity) of the sunlight anytime and anywhere. Below, embodiments of the present invention will be described in detail with reference to accompanying drawings such that those skilled in the art can implement the technique provided by the present invention according to the present disclosure.

Figure 1A:
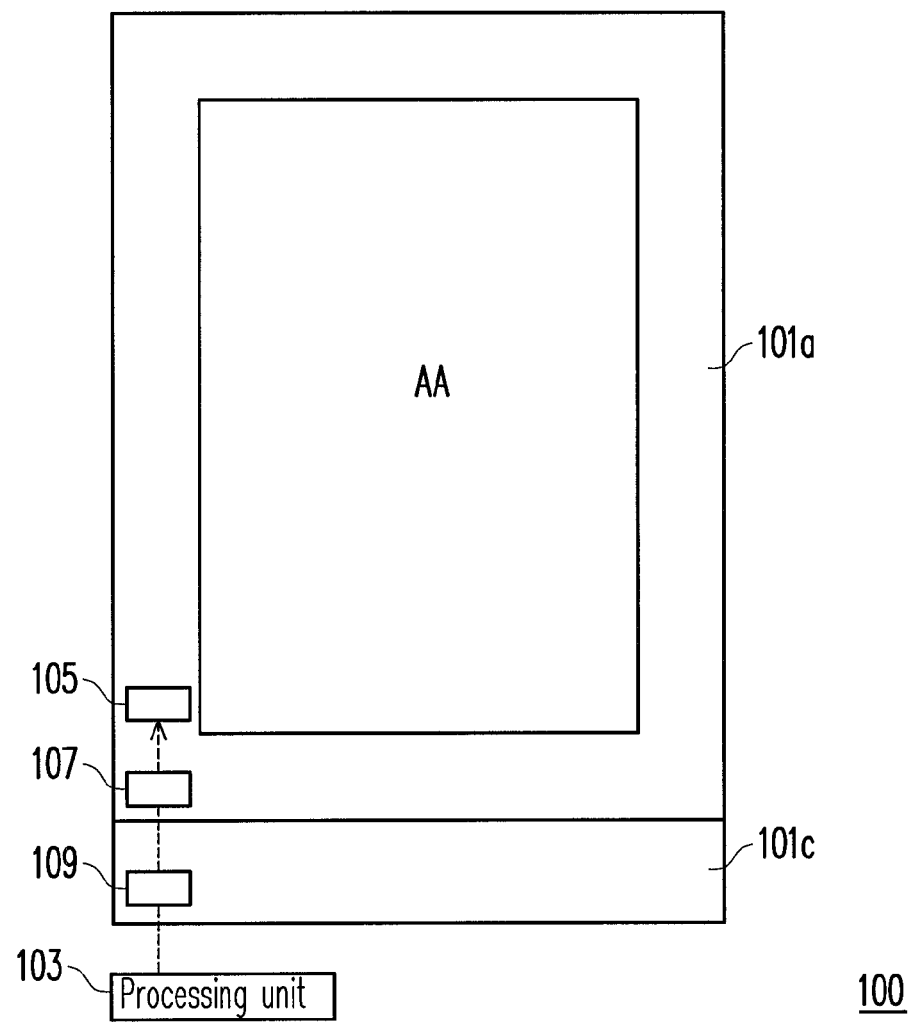
FIG. 1A is a front view of a display apparatus with UV intensity detecting capability according to an embodiment of the present invention.
Figure 1B:
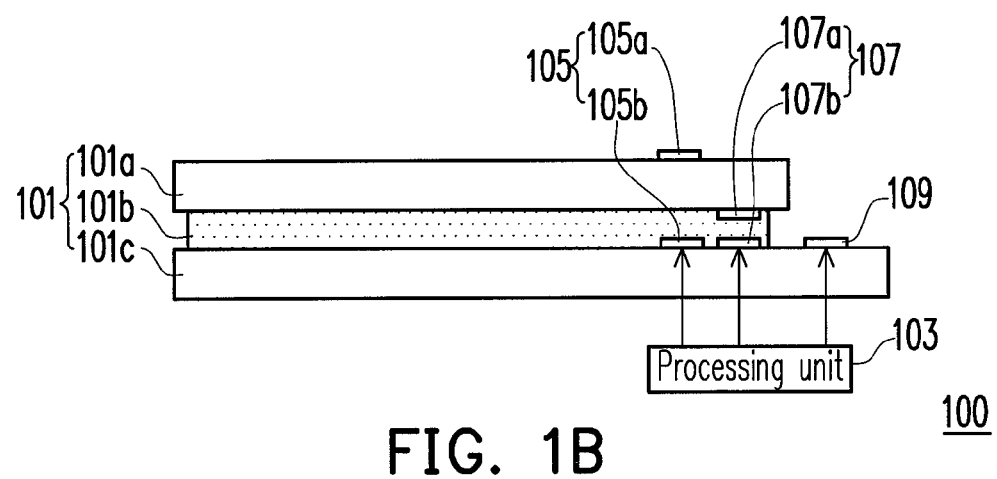
FIG. 1B is a cross-sectional view of the display apparatus in FIG. 1A.

FIG. 1A is a front view of a display apparatus 100 with UV intensity detecting capability according to an embodiment of the present invention. FIG. 1B is a cross-sectional view of the display apparatus 100 in FIG. 1A. Referring to both FIG. 1A and FIG. 1B, the display apparatus 100 (for example, a cell phone, but not limited thereto) comprises a display panel 101 and a processing unit 103, wherein the display panel 101 is composed of an upper substrate 101a (for example, a color filter substrate), a liquid crystal layer 101b, and a lower substrate 101c (for example, an active device array substrate). The upper substrate 101a is disposed opposite to the lower substrate 101c (not limited to the relative position illustrated in FIG. 1B), and the liquid crystal layer 101b is disposed between the upper substrate 101a and the lower substrate 101c.

The display apparatus 100 may further include other elements, such as a timing controller (T-con), a gate driver, a source driver, and a backlight module. However, the technique for displaying an image in a display area AA of the display panel 101 through foregoing elements in the display panel 101 is well-understood by those skilled in the art and is not the focus of the present disclosure, therefore will not be described herein. Below, only the technique related to the present invention will be described.

Figure 2:
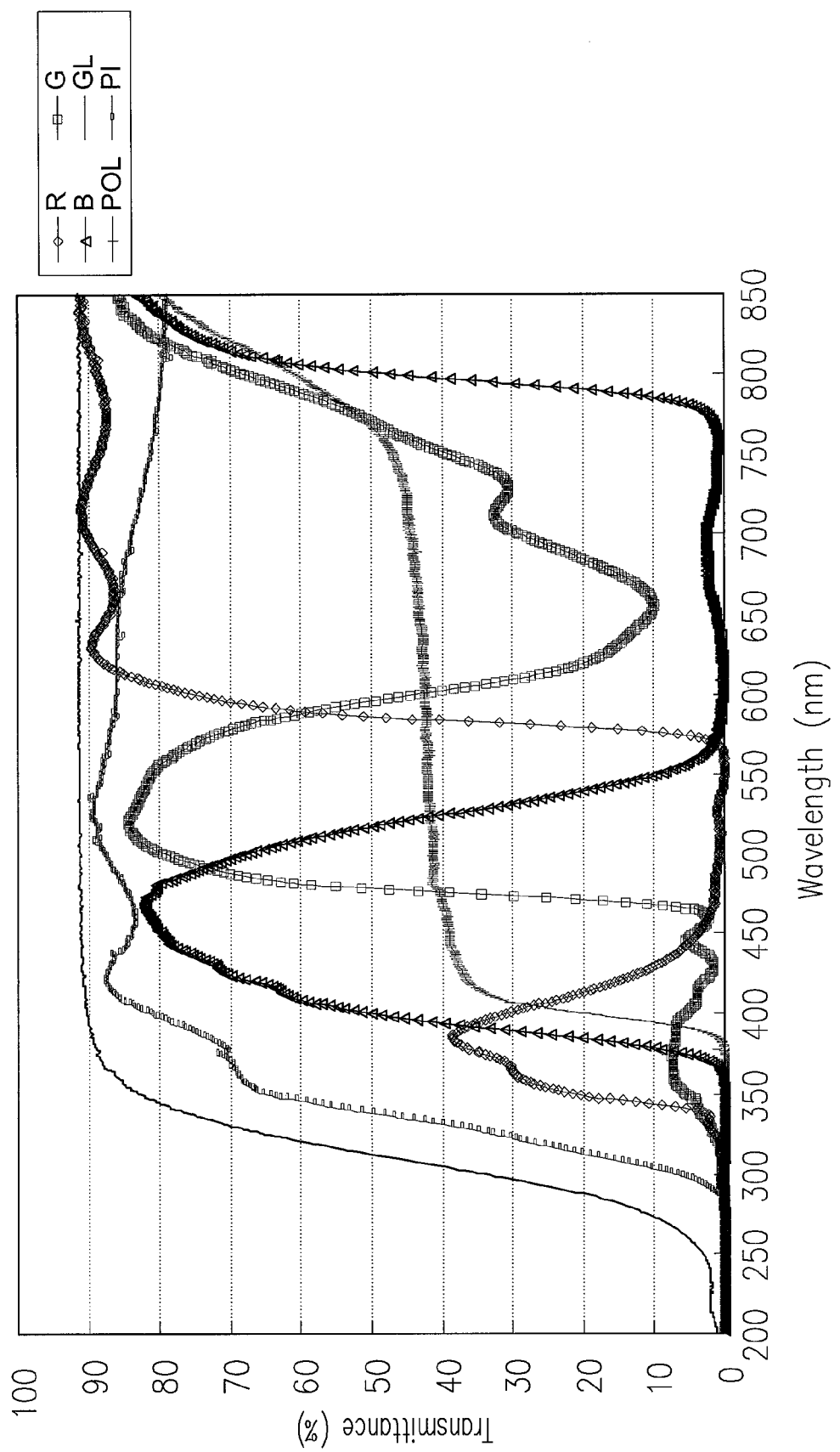
FIG. 2 is a spectrogram of all band of the sunlight according to an embodiment of the present invention.

FIG. 2 is a spectrogram of all band of the sunlight according to an embodiment of the present invention, wherein the abscissa indicates the wavelength (nm) and the ordinate indicates the transmittance (%).

Referring to FIGS. 1A~2, the lower substrate 101c comprises a first photo sensor 109, a second photo sensor 107b, and a third photo sensor 105b for respectively detecting the intensity of the light in a first band, a second band, and a third band and converting the intensity into a first current, a second current, and a third current, wherein the ranges of the second band and the third band are included within the range of the first band.

In the present embodiment, the first photo sensor 109, the second photo sensor 107b, and the third photo sensor 105b are disposed on the lower substrate 101c (some other embodiments could be disposed on the upper substrate), and the first photo sensor 109 is located where the lower substrate 101c doesn't overlap with the upper substrate 101a and served as a detecting unit for detecting the intensity of the light in all band (i.e., the first band, such as a band having its wavelength between 0 nm and 1000 nm) of the sunlight and converting the intensity into the first current.

The upper substrate 101a comprises a first color resist 107a which is corresponding to the second photo sensor 107b on the lower substrate 101c, and the first color resist 107a and the second photo sensor 107b form a detecting unit 107. In the present embodiment, the first color resist 107a may be a red color resist directly disposed on the upper substrate 101a, and accordingly, the second photo sensor 107b detects the intensity of light in a red band (i.e., the second band, such as a band having its wavelength between 335 nm and 450 nm) of the sunlight and converts the intensity into the second current. It should be mentioned herein that because the wavelength of the red band detected by the second photo sensor 107b changes along with the composition (for example, the concentration or the thickness) of the first color resist 107a (i.e., the red color resist), the wavelength of the red band is not limited to foregoing values in the present embodiment.

The upper substrate 101a further includes a polarizer 105a which is corresponding to the third photo sensor 105b on the lower substrate 101c, and the polarizer 105a and the third photo sensor 105b form a detecting unit 105. In the present embodiment, the polarizer 105a is only a part of a polarizer disposed on the upper substrate 101a, and accordingly, the third photo sensor 105b detects the intensity of light in a band (i.e., the third band) having its wavelength longer than 375 nm (not limited to this value) and converts the intensity into the third current.

The processing unit 103 is coupled to the first photo sensor 109, the second photo sensor 107b, and the third photo sensor 105b for receiving and processing the first current, the second current, and the third current respectively converted by the first photo sensor 109, the second photo sensor 107b, and the third photo sensor 105b, so as to obtain the UV intensity (i.e., the UVI) of the sunlight.

In the present embodiment, the processing unit 103 may be disposed on the lower substrate 101c or disposed independently in the system of the display apparatus 100, and the processing unit 103 deducts the second current and the third current respectively converted by the second photo sensor 107b and the third photo sensor 105b from the first current converted by the first photo sensor 109 to obtain the UV intensity of the sunlight. However, preferably, the first current, the second current, and the third current could be multiplied by a corresponding correction coefficient respectively before the processing unit 103 deducts the second current and the third current from the first current to obtain the UV intensity of the sunlight.

Accordingly, the processing unit 103 obtains the UV intensity corresponding to the intensity of light in a UV band having its wavelength between 280 nm and 320 nm (i.e., the UVB). The processing unit 103 simply sends the UV intensity value to a control terminal (for example, the timing controller) of the display panel 101 and the display apparatus is allowed showing the UV intensity, so that a user can obtain the UVI off hand and effectively protecting himself/herself from the damage of UV light to his/her eyes and skin.

Figure 3A:
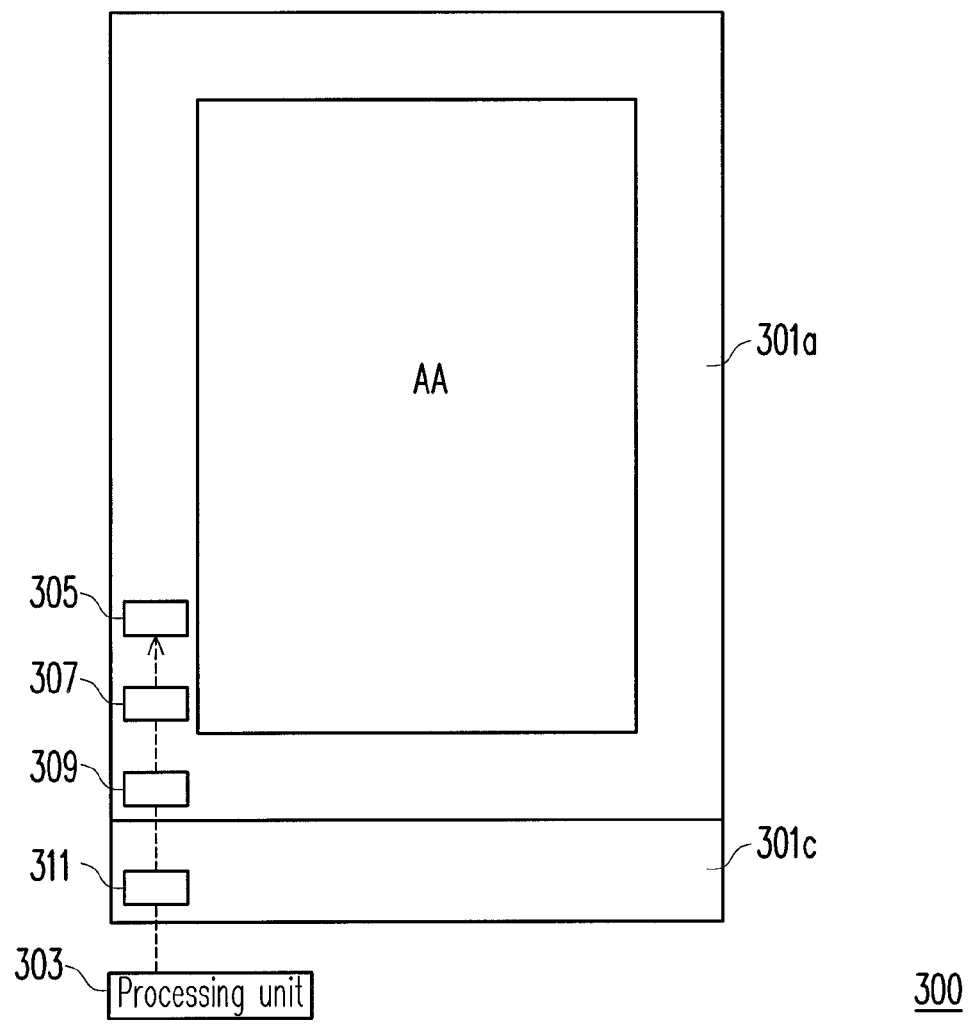
FIG. 3A is a front view of a display apparatus with UV intensity detecting capability according to another embodiment of the present invention.
Figure 3B:
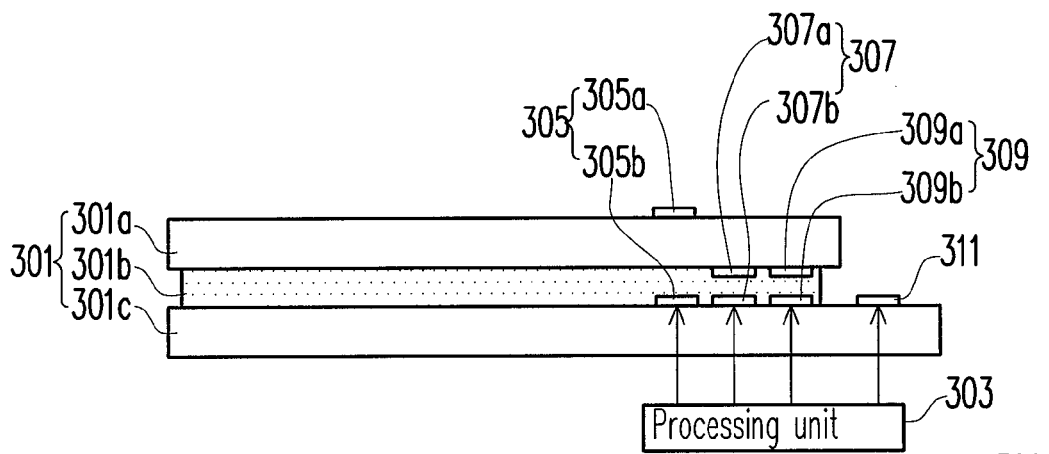
FIG. 3B is a cross-sectional view of the display apparatus in FIG. 3A.

FIG. 3A is a front view of a display apparatus 300 with UV intensity detecting capability according to another embodiment of the present invention. FIG. 3B is a cross-sectional view of the display apparatus 300 in FIG. 3A. Referring to FIGS. 2, 3A, and 3B, the display apparatus 300 (for example, a cell phone, but not limited thereto) includes a display panel 301 and a processing unit 303, wherein the display panel 301 is composed of an upper substrate 301a (for example, a color filter substrate), a liquid crystal layer 301b, and a lower substrate 301c (for example, an active device array substrate). The upper substrate 301a is disposed opposite to the lower substrate 301c (not limited to the relative position illustrated in FIG. 3B), and the liquid crystal layer 301b is disposed between the upper substrate 301a and the lower substrate 301c.

The display apparatus 300 may further include other elements, such as a timing controller, a gate driver, a source driver, and a backlight module. However, the technique for displaying an image in a display area AA of the display panel 301 through foregoing elements in the display panel 301 is well-understood by those skilled in the art and is not the focus of the present disclosure, therefore will not be described herein. Below, only the technique related to the present invention will be described.

The lower substrate 301c includes a first photo sensor 311, a second photo sensor 309b, a third photo sensor 305b, and a fourth photo sensor 307b for respectively detecting the intensity of the light in a first band, a second band, a third band, and a fourth band and converting the intensity into a first current, a second current, a third current, and a fourth current, wherein the ranges of the second band, the third band, and the fourth band are included within the range of the first band.

In the present embodiment, the first photo sensor 311, the second photo sensor 309b, the third photo sensor 305b, and the fourth photo sensor 307b are disposed on the lower substrate 301c (some other embodiments could be disposed on the upper substrate), and the first photo sensor 311 is located where the lower substrate 301c doesn't overlap with the upper substrate 301a and served as a detecting unit for detecting the intensity of the light in all band (i.e., the first band, such as a band having it wavelength between 0 nm and 1000 nm) of the sunlight and converting the intensity into the first current.

The upper substrate 301a includes a first color resist 309a which is corresponding to the second photo sensor 309b on the lower substrate 301c, and the first color resist 309a and the second photo sensor 309b form a detecting unit 309. In the present embodiment, the first color resist 309a may be a red color resist directly disposed on the upper substrate 301a, and accordingly, the second photo sensor 309b detects the intensity of the light in a red band (i.e., the second band) of the sunlight and converts the intensity into the second current. It should be mentioned herein that because the wavelength of the red band detected by the second photo sensor 309b changes along with the composition (for example, the concentration or the thickness) of the first color resist 309a (i.e., the red color resist), the wavelength of the red band is not limited to foregoing values in the present embodiment.

The upper substrate 301a further includes a polarizer 305a which is corresponding to the third photo sensor 305b of the lower substrate 301c, and the polarizer 305a and the third photo sensor 305b form a detecting unit 305. In the present embodiment, the polarizer 305a may be a part of a polarizer disposed on the upper substrate 301, and accordingly, the third photo sensor 305b detects the intensity of the light in a band (i.e., the third band) having its wavelength longer than 375 nm (not limited to this value) and converts the intensity into the third current.

The upper substrate 301a further includes a second color resist 307a which is corresponding to the fourth photo sensor 307b of the lower substrate 301c, and the second color resist 307a and the fourth photo sensor 307b form a detecting unit 307. In the present embodiment, the second color resist 307a may be a blue color resist disposed on the upper substrate 301a, and accordingly, the fourth photo sensor 307b detects the intensity of the light in a blue band (i.e., the fourth band, such as a band having its wavelength between 380 nm and 550 nm) of the sunlight and converts the intensity into the fourth current. It should be mentioned herein that because the wavelength of the blue band detected by the fourth photo sensor 307b changes along with the composition (for example, the concentration or the thickness) of the second color resist 307a (i.e., the blue color resist), the wavelength of the blue band is not limited to foregoing values in the present embodiment.

The processing unit 303 is coupled to the first photo sensor 311, the second photo sensor 309b, the third photo sensor 305b, and the fourth photo sensor 307b for receiving and processing the first current, the second current, the third current, and the fourth current respectively converted by the first photo sensor 311, the second photo sensor 309b, the third photo sensor 305b, and the fourth photo sensor 307b so as to obtain the UV intensity of the sunlight.

In the present embodiment, the processing unit 303 may be disposed on the lower substrate 301c or disposed independently in the system of the display apparatus 300. The processing unit 303 deducts the second current, the third current, and the fourth current respectively converted by the second photo sensor 309b, the third photo sensor 305b, and the fourth photo sensor 307b from the first current converted by the first photo sensor 311 to obtain the UV intensity of the sunlight. However, preferably, the first current, the second current, third current, and the fourth current could be multiplied by a corresponding correction coefficient respectively before the processing unit 303 deducts the second current, the third current, and the fourth current from the first current to obtain the UV intensity of the sunlight.

Accordingly, the processing unit 303 obtains the UV intensity corresponding to the intensity of the light in a UV band having its wavelength between 280 nm and 320 nm (i.e., the UVB). The processing unit 303 simply sends the UV intensity value to a control terminal (for example, the timing controller) of the display panel 301 and the display apparatus is allowed showing the UV intensity, so that a user can obtain the UVI off hand, effectively protecting himself/herself from the damage of UV light to his/her eyes and skin.

Figure 4A:
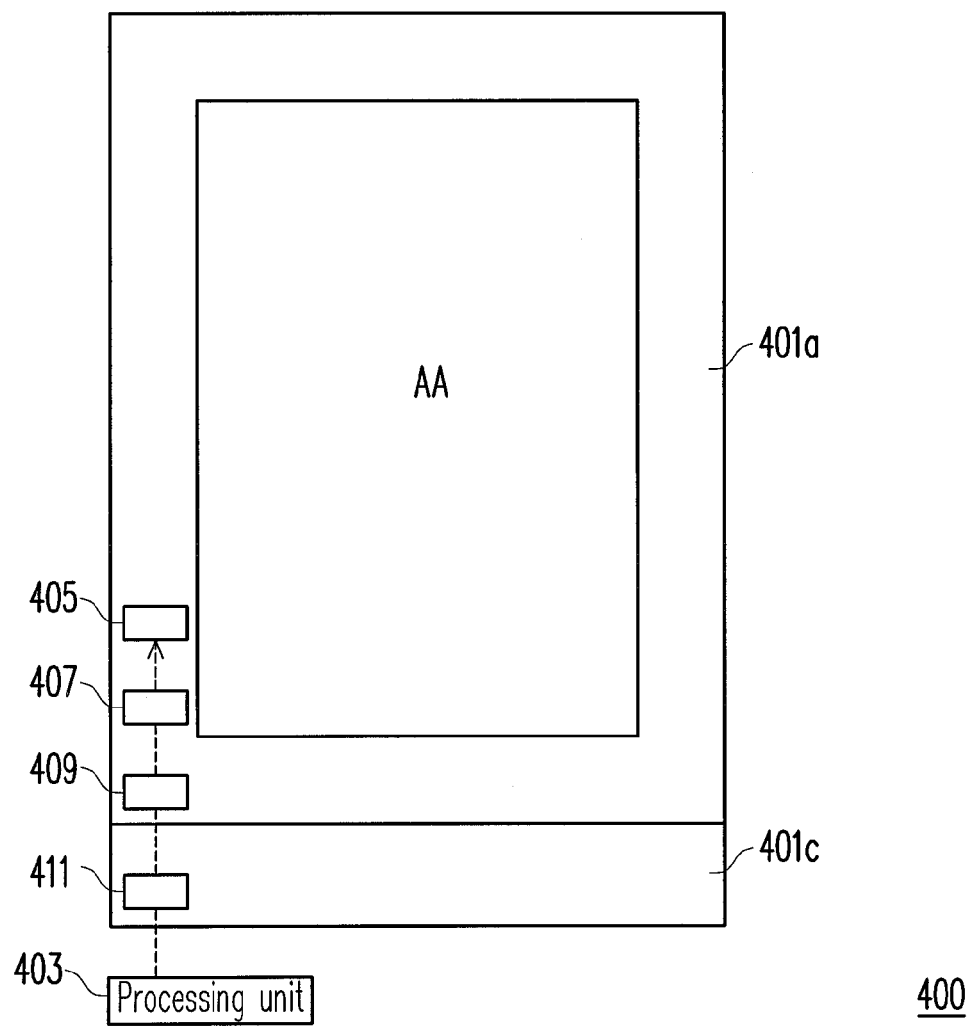
FIG. 4A is a front view of a display apparatus with UV intensity detecting capability according to yet another embodiment of the present invention.
Figure 4B:
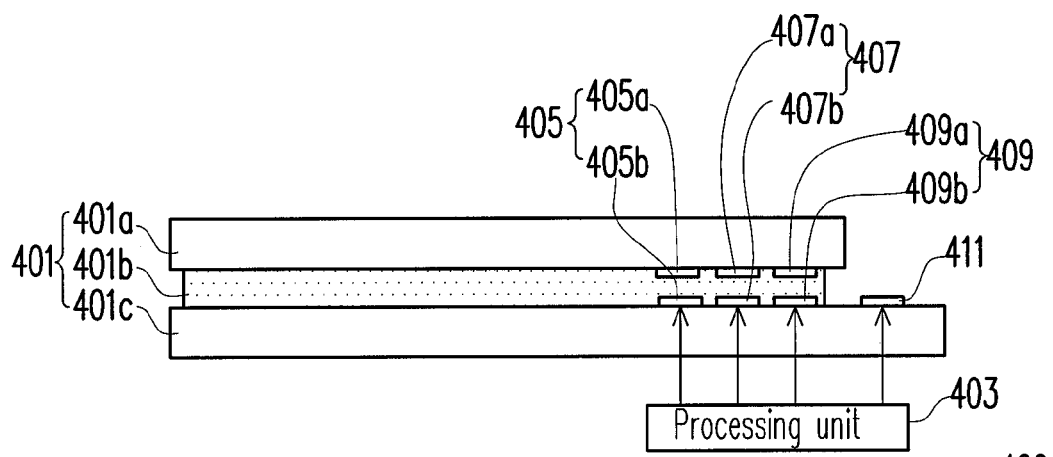
FIG. 4B is a cross-sectional view of the display apparatus in FIG. 4A.

FIG. 4A is a front view of a display apparatus 400 with UV intensity detecting capability according to yet another embodiment of the present invention. FIG. 4B is a cross-sectional view of the display apparatus in FIG. 4A. Referring to FIGS. 2, 4A, and 4B, the display apparatus 400 (for example, a cell phone, but not limited thereto) includes a display panel 401 and a processing unit 403, wherein the display panel 401 is composed of an upper substrate 401a (for example, a color filter substrate), a liquid crystal layer 401b, and a lower substrate 401c (for example, an active device array substrate). The upper substrate 401a is disposed opposite to the lower substrate 401c (not limited to the relative position illustrated in FIG. 4B), and the liquid crystal layer 401b is disposed between the upper substrate 401a and the lower substrate 401c.

The display apparatus 400 may further include other elements, such as a timing controller, a gate driver, a source driver, and a backlight module. However, the technique for displaying an image in a display area AA of the display panel 401 through foregoing elements of the display panel 401 is well-understood by those skilled in the art and is not the focus of the present disclosure, therefore will not be described herein. Below, only the technique related to the present invention will be described.

The lower substrate 401c includes a first photo sensor 411, a second photo sensor 409b, a third photo sensor 407b, and a fourth photo sensor 405b for respectively detecting the intensity of the light in a first band, a second band, a third band, and a fourth band and converting the intensity into a first current, a second current, a third current, and a fourth current, wherein the ranges of the second band, the third band, and the fourth band are included within the range of the first band.

In the present embodiment, the first photo sensor 411, the second photo sensor 409b, the third photo sensor 407b, and the fourth photo sensor 405b are disposed on the lower substrate 401c (some other embodiments could be disposed on the upper substrate), and the first photo sensor 411 is located where the lower substrate 401c doesn't overlap with the upper substrate 401a and served as a detecting unit for (i.e., not through the upper substrate 401a and the liquid crystal layer 401b) detecting the intensity of the light in all band (i.e., the first band, such as a band having its wavelength between 0 nm and 1000 nm) of the sunlight and converting the intensity into the first current.

The upper substrate 401a includes a first color resist 409a which is corresponding to the second photo sensor 409b on the lower substrate 401c, and the first color resist 409a and the second photo sensor 409b form a detecting unit 409. In the present embodiment, the first color resist 409a may be a red color resist disposed on the upper substrate 401a, and accordingly, the second photo sensor 409b detects the intensity of the light in a red band (i.e., the second band) of the sunlight and converts the intensity into the second current. It should be mentioned herein that because the wavelength of the red band detected by the second photo sensor 409b changes along with the composition (for example, the concentration or the thickness) of the first color resist 409a (i.e., the red color resist), the wavelength of the red band is not limited to foregoing values in the present embodiment.

The upper substrate 401a further includes a second color resist 407a which is corresponding to the third photo sensor 407b on the lower substrate 401c, and the second color resist 407a and the third photo sensor 407b form a detecting unit 407. In the present embodiment, the second color resist 407a may be a green color resist disposed on the upper substrate 401a, and accordingly, the third photo sensor 407b detects the intensity of the light in a green band (i.e., the third band, such as a band having its wavelength between 450 nm and 650 nm) of the sunlight and converts the intensity into the third current. Similarly, because the wavelength of the green band detected by the third photo sensor 407b changes along with the composition (for example, the concentration or the thickness) of the second color resist 407a (i.e., the green color resist), the wavelength of the green band is not limited to foregoing values in the present embodiment.

The upper substrate 401a further includes a third color resist 405a which is corresponding to the fourth photo sensor 405b on the lower substrate 401c, and the third color resist 405a and the fourth photo sensor 405b form a detecting unit 405. In the present embodiment, the third color resist 405a may be a blue color resist disposed on the upper substrate 401a, and accordingly, the fourth photo sensor 405b detects the intensity of the light in a blue band (i.e., the fourth band) of the sunlight and converts the intensity into the fourth current. Similarly, because the wavelength of the blue band detected by the fourth photo sensor 405b changes along with the composition (for example, the concentration or the thickness) of the third color resist 405a (i.e., the blue color resist), the wavelength of the blue band is not limited to foregoing values in the present embodiment.

The processing unit 403 is coupled to the first photo sensor 411, the second photo sensor 409b, the third photo sensor 407b, and the fourth photo sensor 405b for receiving and processing the first current, the second current, the third current, and the fourth current respectively converted by the first photo sensor 411, the second photo sensor 409b, the third photo sensor 407b, and the fourth photo sensor 405b, so as to obtain the UV intensity of the sunlight.

In the present embodiment, the processing unit 403 may be disposed on the lower substrate 401c or disposed independently in the system of the display apparatus 400, and the processing unit 403 deducts the second current, the third current, and the fourth current respectively converted by the second photo sensor 409b, the third photo sensor 407b, and the fourth photo sensor 405b from the first current converted by the first photo sensor 411 to obtain the UV intensity of the sunlight. However, preferably, the first current, the second current, the third current, and the fourth current could be multiplied by a corresponding correction coefficient respectively before the processing unit 403 deducts the second current, the third current, and the fourth current from the first current to obtain the UV intensity of the sunlight.

Accordingly, the processing unit 403 obtains the UV intensity corresponding to the intensity of the light in a UV band having its wavelength between 280 nm and 320 nm (i.e., the UVB). The processing unit 403 simply sends the UV intensity value to a control terminal (for example, the timing controller) of the display panel 401 and the display apparatus is allowed showing the UV intensity, so that a user can obtain the UVI off hand and effectively protecting himself/herself from the damage of UV light to his/her eyes and skin. However, the bands detected by various detecting units are not limited to foregoing description; instead, they can be adjusted according to the actual requirement.

Figure 5A:
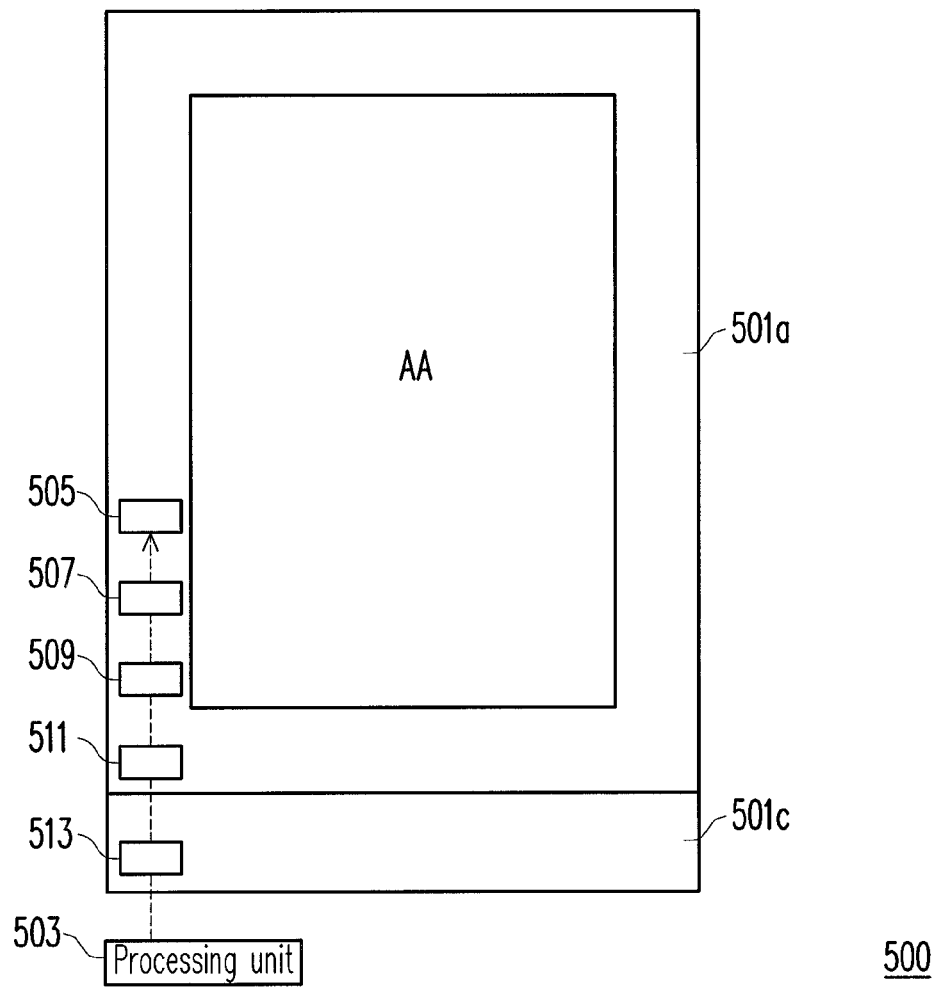
FIG. 5A is a front view of a display apparatus with UV intensity detecting capability according to still another embodiment of the present invention.
Figure 5B:
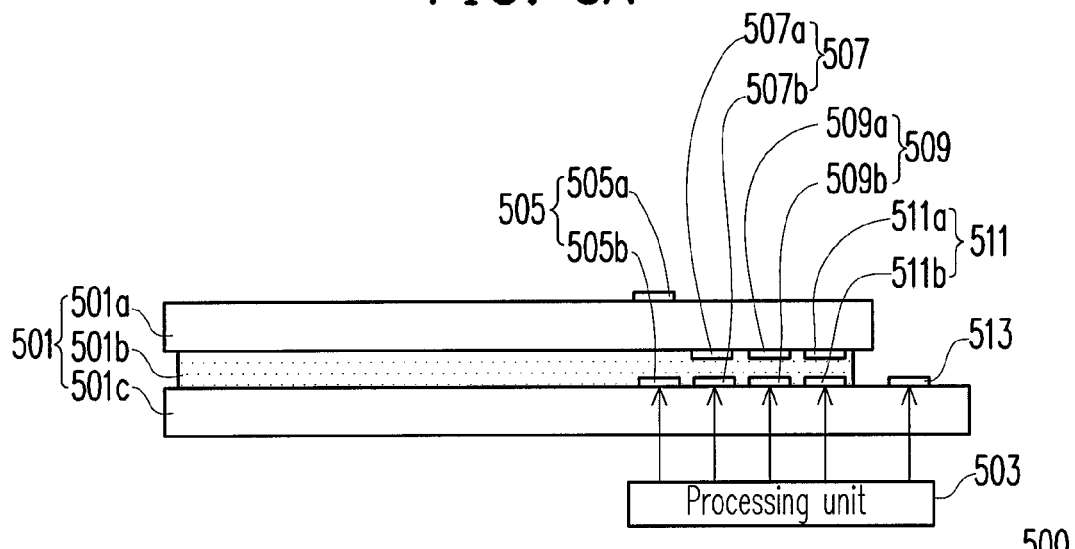
FIG. 5B is a cross-sectional view of the display apparatus in FIG. 5A.

FIG. 5A is a front view of a display apparatus 500 with UV intensity detecting capability according to still another embodiment of the present invention. FIG. 5B is a cross-sectional view of the display apparatus 500 in FIG. 5A. Referring to FIGS. 2, 5A, and 5B, the display apparatus 500 (for example, a cell phone, but not limited thereto) includes a display panel 501 and a processing unit 503, wherein the display panel 501 is composed of an upper substrate 501a (for example, a color filter substrate), a liquid crystal layer 501b, and a lower substrate 501c (for example, an active device array substrate). The upper substrate 501a is disposed opposite to the lower substrate 501c (not limited to the relative position illustrated in FIG. 5B), and the liquid crystal layer 501b is disposed between the upper substrate 501a and the lower substrate 501c.

The display apparatus 500 may further include other elements, such as a timing controller, a gate driver, a source driver, and a backlight module. However, the technique for displaying an image in a display area AA of the display panel 501 through foregoing elements of the display panel 501 is well-understood by those skilled in the art and is not the focus of the present disclosure, therefore will not be described herein. Below, only the technique related to the present invention will be described.

The lower substrate 501c includes a first photo sensor 513, a second photo sensor 511b, a third photo sensor 505b, a fourth photo sensor 509b, and a fifth photo sensor 507b for respectively detecting the intensity of the light in a first band, a second band, a third band, a fourth band, and a fifth band and converting the intensity into a first current, a second current, a third current, a fourth current, and a fifth current, wherein the ranges of the second band, the third band, the fourth band, and the fifth band are included within the range of the first band.

In the present embodiment, the first photo sensor 513, the second photo sensor 511b, the third photo sensor 505b, the fourth photo sensor 509b, and the fifth photo sensor 507b are disposed on the lower substrate 501c (some other embodiments could be disposed on the upper substrate), and the first photo sensor 513 is located where the lower substrate 101c doesn't overlap with the upper substrate 101a and served as a detecting unit for detecting the intensity of the light in all band (i.e., the first band, such as a band having its wavelength between 0 nm and 1000 nm) of the sunlight and converting the intensity into the first current. However, according to the present invention, the upper substrate 501a of the first photo sensor 513 may also include an alignment film or an insulation layer (not shown) for detecting the intensity of the light in all band of the sunlight and converting the intensity into the first current.

The upper substrate 501a includes a first color resist 511a which is corresponding to the second photo sensor 511b on the lower substrate 501c, and the first color resist 511a and the second photo sensor 511b form a detecting unit 511b. In the present embodiment, the first color resist 511a may be a red color resist disposed on the upper substrate 501a, and accordingly, the second photo sensor 511b detects the intensity of the light in a red band (i.e., the second band, such as a band having its wavelength between 335 nm and 450 nm or longer than 560 nm) of the sunlight and converts the intensity into the second current. Because the wavelength of the red band detected by the second photo sensor 511b changes along with the composition (for example, the concentration or the thickness) of the first color resist 511a (i.e., the red color resist), the band of the red band is not limited to foregoing values in the present embodiment.

The upper substrate 501a further includes a polarizer 505a which is corresponding to the third photo sensor 505b on the lower substrate 501c, and the polarizer 505a and the third photo sensor 505b form a detecting unit 505. In the present embodiment, the polarizer 505a may be a part of a polarizer disposed on the upper substrate 501a, and accordingly, the third photo sensor 505b detects the intensity of the light in a band (i.e., the third band) having its wavelength longer than 375 nm (not limited to this value) and converts the intensity into the third current.

The upper substrate 501a further includes a second color resist 509a which is corresponding to the fourth photo sensor 509b of the lower substrate 501c, and the second color resist 509a and the fourth photo sensor 509b form a detecting unit 509. In the present embodiment, the second color resist 509a may be a green color resist disposed on the upper substrate 501a, and accordingly, the fourth photo sensor 509b detects the intensity of the light in a green band (i.e., the fourth band, such as a band having its wavelength between 450 nm and 650 nm) of the sunlight and converts the intensity into the fourth current. Because the wavelength of the green band detected by the fourth photo sensor 509b changes along with the composition (for example, the concentration or the thickness) of the second color resist 509a (i.e., the green color resist), the wavelength of the green band is not limited to foregoing values in the present embodiment.

The upper substrate 501a further includes a third color resist 507a which is corresponding to the fifth photo sensor 507b of the lower substrate 501c, and the third color resist 507a and the fifth photo sensor 507b form a detecting unit 507. In the present embodiment, the third color resist 507a is a blue color resist disposed on the upper substrate 501a, and accordingly, the fifth photo sensor 507b detects the intensity of the light in a blue band (i.e., the fifth band, such as a band having its wavelength between 380 nm and 550 nm or longer than 775 nm) of the sunlight and converts the intensity into the fifth current. Because the wavelength of the blue band detected by the fifth photo sensor 507b changes along with the composition (for example, the concentration or the thickness) of the third color resist 507a (i.e., the blue color resist), the wavelength of the blue light band is not limited to foregoing values in the present embodiment.

The processing unit 503 is coupled to the first photo sensor 513, the second photo sensor 511b, the third photo sensor 505b, the fourth photo sensor 509b, and the fifth photo sensor 507b for receiving and processing the first current, the second current, the third current, the fourth current, and the fifth current respectively converted by the first photo sensor 513, the second photo sensor 511b, the third photo sensor 505b, the fourth photo sensor 509b, and the fifth photo sensor 507b so as to obtain the UV intensity of the sunlight.

In the present embodiment, the processing unit 503 may be disposed on the lower substrate 501c or disposed independently in the system of the display apparatus 500, and the processing unit 503 deducts a combination (including at least one of the three combinations in foregoing three embodiments but not limited thereto) of the second current, the third current, the fourth current, and the fifth current respectively converted by the second photo sensor 511b, the third photo sensor 505b, the fourth photo sensor 509b, and the fifth photo sensor 507b from the first current converted by the first photo sensor 513 to obtain the UV intensity of the sunlight.

In other words, the processing unit 503 at least deducts the second current and the third current respectively converted by the second photo sensor 511b and the third photo sensor 505b from the first current converted by the first photo sensor 513 to obtain the UV intensity of the sunlight, deducts the second current, the third current, and the fifth current respectively converted by the second photo sensor 511b, the third photo sensor 505b, and the fifth photo sensor 507b from the first current converted by the first photo sensor 513 to obtain the UV intensity of the sunlight, or deducts the second current, the fourth current, and the fifth current respectively converted by the second photo sensor 511b, the fourth photo sensor 509b, and the fifth photo sensor 507b from the first current converted by the first photo sensor 513 to obtain the UV intensity of the sunlight.

However, preferably, the first current, the second current, the third current, the fourth current, and the fifth current could be multiplied by a corresponding correction coefficient respectively before the processing unit 503 deducts a combination of the second current, the third current, the fourth current, and the fifth current from the first current to obtain the UV intensity of the sunlight.

Accordingly, the processing unit 503 obtains the UV intensity corresponding to the intensity of the light in a UV band having its length shorter than 335 nm (i.e., the UVB, having its length between 280 nm and 320 nm). The processing unit 503 simply sends the UV intensity value to a control terminal (for example, a timing controller) of the display panel 501 and the display apparatus is allowed showing the UV intensity, so that a user can obtain the UVI off hand, effectively protecting himself/herself from the damage of UV light to his/her eyes and skin.

Figure 6:
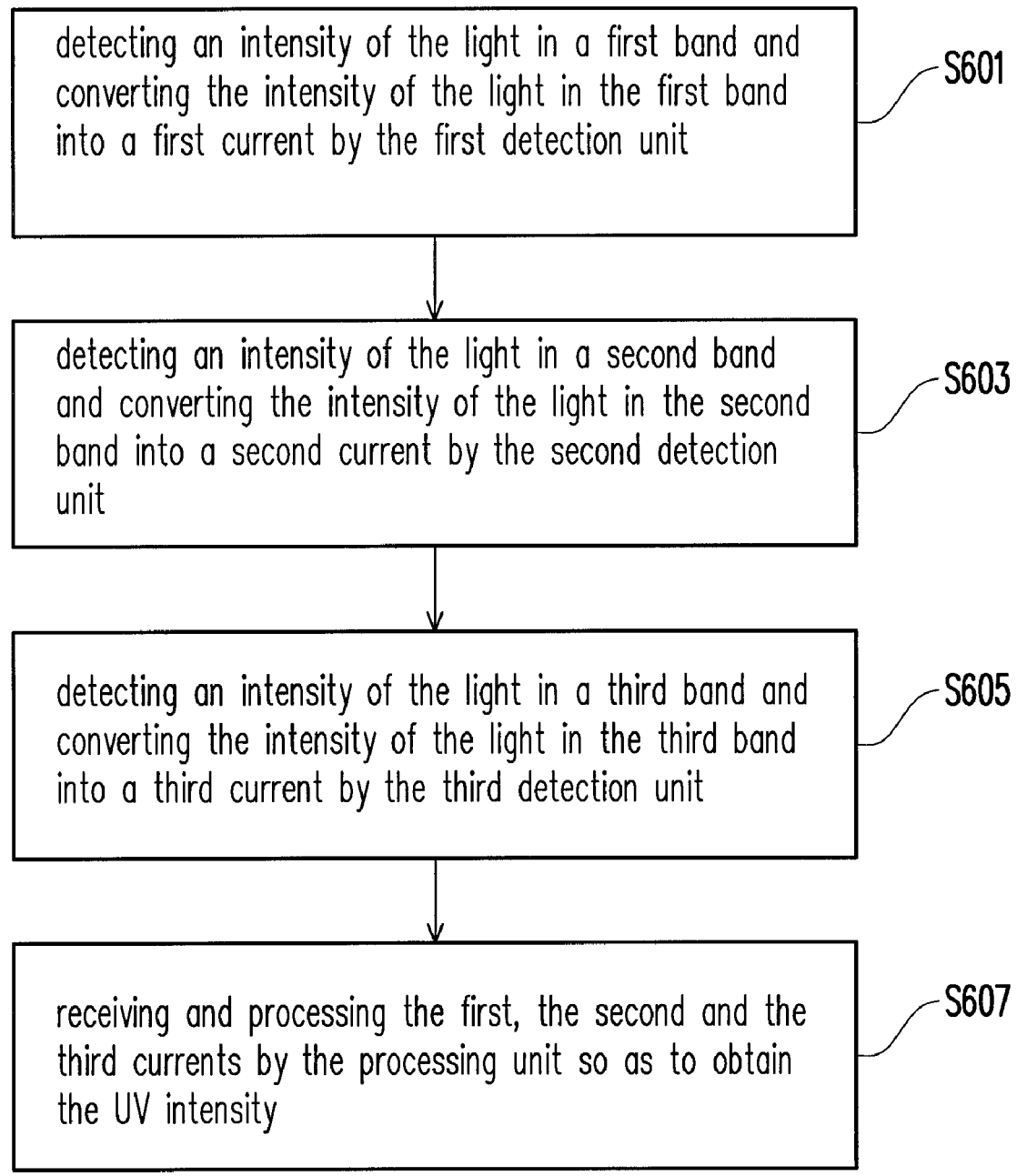
FIG. 6 is a flowchart of a method for detecting UV intensity by using a display apparatus with a display panel and a processing unit according to an embodiment of the present invention.

FIG. 6 is a flowchart of a method for detecting UV intensity by using a display apparatus with a display panel and a processing unit according to an embodiment of the present invention, wherein the display panel at least includes a first detection unit, a second detection unit and a third detection unit. Please refer to FIG. 6, the method in the present embodiment includes following steps. Step S601 is detecting an intensity of the light in a first band and converting the intensity of the light in the first band into a first current by the first detection unit. Step S603 is detecting an intensity of the light in a second band and converting the intensity of the light in the second band into a second current by the second detection unit.

Step S605 is detecting an intensity of the light in a third band and converting the intensity of the light in the third band into a third current by the third detection unit, wherein the ranges of the second band and the third band are comprised within the range of the first band. The first band, for example, is the light in all band of the sunlight, the second band, for example, is the light in a red band, and the third band, for example, is the light in a band having its wavelength longer than 375 nm (not limited to this value). Step S607 is receiving and processing the first, the second, and the third currents by the processing unit so as to obtain the UV intensity. In the present embodiment, the step of processing the first, the second, and the third currents includes respectively multiplying the first, the second and the third currents by a corresponding correction coefficient; and deducting the second and the third currents from the first current to obtain the UV intensity.

Figure 7:
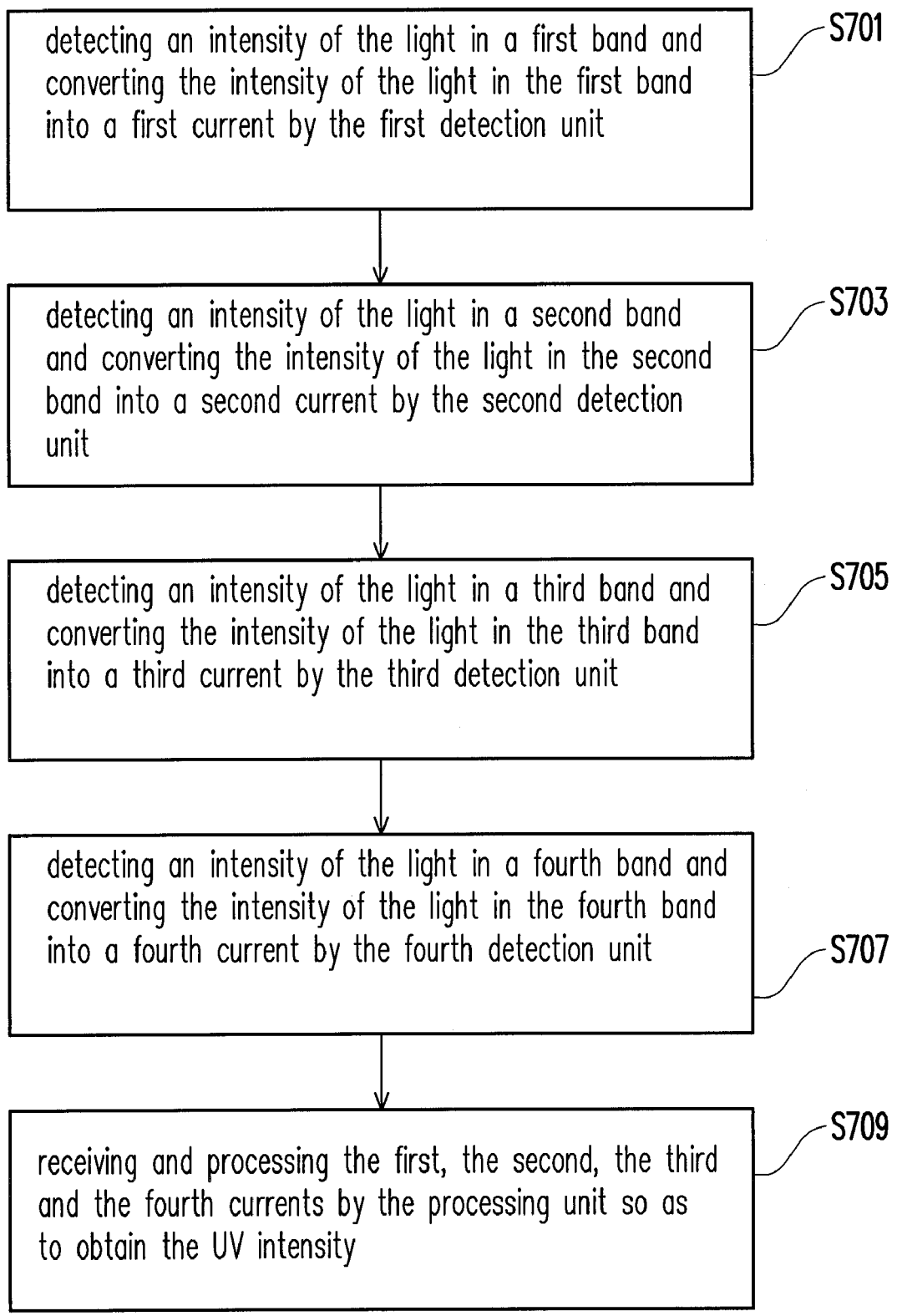
FIG. 7 is a flowchart of a method for detecting UV intensity by using a display apparatus with a display panel and a processing unit according to another embodiment of the present invention.

FIG. 7 is a flowchart of a method for detecting UV intensity by using a display apparatus with a display panel and a processing unit according to another embodiment of the present invention, wherein the display panel at least includes a first detection unit, a second detection unit, a third detection unit and a fourth detection unit. Please refer to FIG. 7, the method in the present embodiment includes following steps. Step S701 is detecting an intensity of the light in a first band and converting the intensity of the light in the first band into a first current by the first detection unit. Step S703 is detecting an intensity of the light in a second band and converting the intensity of the light in the second band into a second current by the second detection unit.

Step S705 is detecting an intensity of the light in a third band and converting the intensity of the light in the third band into a third current by the third detection unit. Step S707 is detecting an intensity of the light in a fourth band and converting the intensity of the light in the fourth band into a fourth current by the fourth detection unit, wherein the ranges of the second band, the third band and the fourth band are comprised within the range of the first band. The first band, for example, is the light in all band of the sunlight, the second band, for example, is the light in a red band, the third band, for example, is the light in a green band or is the light in a band having its wavelength longer than 375 nm (not limited to this value), and the fourth band, for example, is the light in a blue band.

Step S709 is receiving and processing the first, the second, the third and the fourth currents by the processing unit so as to obtain the UV intensity. In the present embodiment, the step of processing the first, the second, the third and the fourth currents includes respectively multiplying the first, the second, the third and the fourth currents by a corresponding correction coefficient; and deducting the second, the third, and the fourth currents from the first current to obtain the UV intensity.

Figure 8:
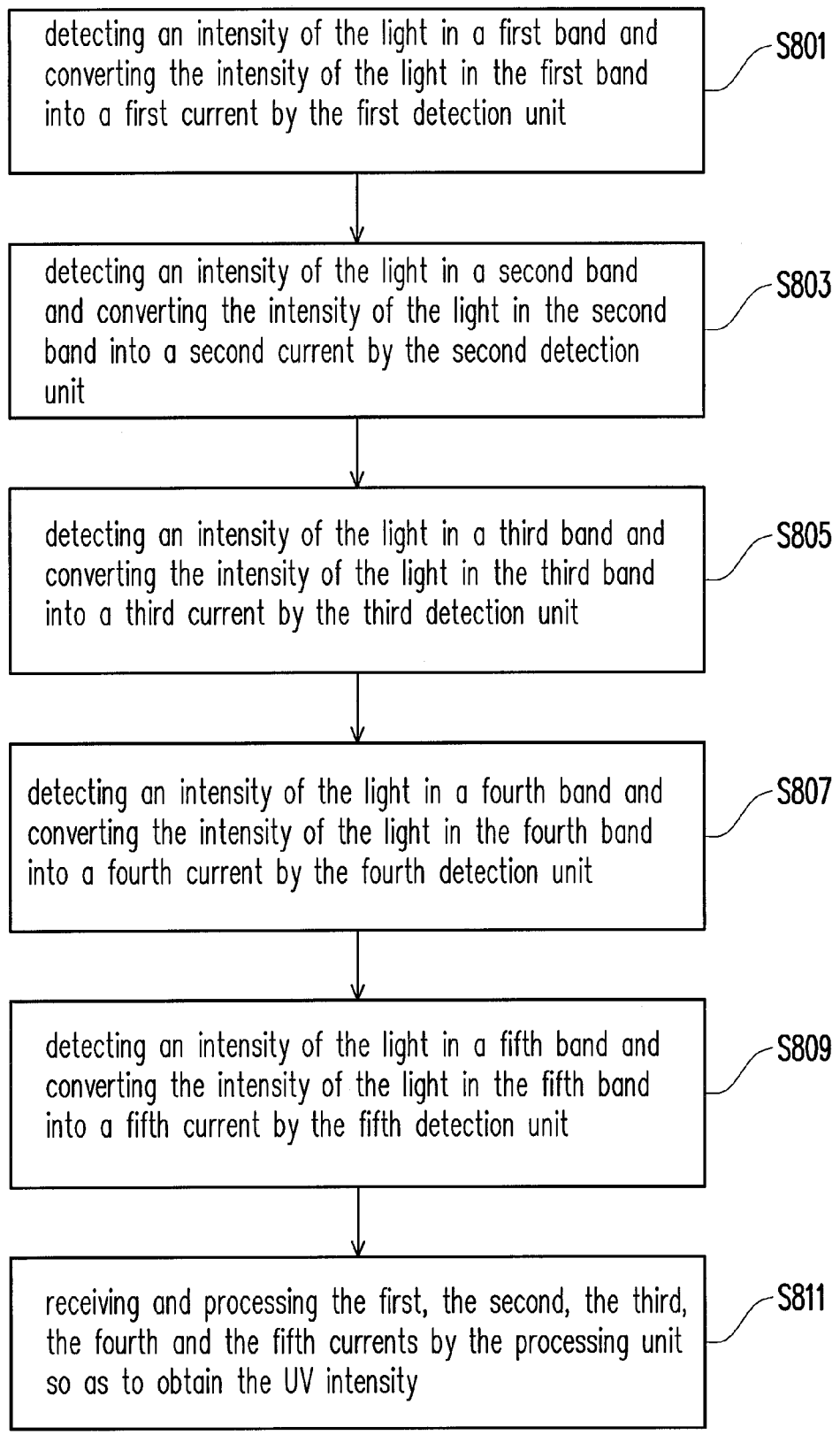
FIG. 8 is a flowchart of a method for detecting UV intensity by using a display apparatus with a display panel and a processing unit according to another embodiment of the present invention.

FIG. 8 is a flowchart of a method for detecting UV intensity by using a display apparatus with a display panel and a processing unit according to another embodiment of the present invention, wherein the display panel at least includes a first detection unit, a second detection unit, a third detection unit, a fourth detection unit and a fifth detection unit. Please refer to FIG. 8, the method in the present embodiment includes following steps. Step S801 is detecting an intensity of the light in a first band and converting the intensity of the light in the first band into a first current by the first detection unit. Step S803 is detecting an intensity of the light in a second band and converting the intensity of the light in the second band into a second current by the second detection unit.

Step S805 is detecting an intensity of the light in a third band and converting the intensity of the light in the third band into a third current by the third detection unit. Step S807 is detecting an intensity of the light in a fourth band and converting the intensity of the light in the fourth band into a fourth current by the fourth detection unit. Step S809 is detecting an intensity of the light in a fifth band and converting the intensity of the light in the fifth band into a fifth current by the fifth detection unit.

In the present embodiment, the ranges of the second band, the third band, the fourth band and the fifth band are comprised within the range of the first band, and the first band, for example, is the light in all band of the sunlight, the second band, for example, is the light in a red band, the third band, for example, is the light in a band having its wavelength longer than 375 nm (not limited to this value), the fourth band, for example, is the light in a green band, and the fifth band, for example, is the light in a blue band.

Step S811 is receiving and processing the first, the second, the third, the fourth and the fifth currents by the processing unit so as to obtain the UV intensity. In the present embodiment, the step of processing the first, the second, the third, the fourth and the fifth currents includes respectively multiplying the first, the second, the third, the fourth and the fifth currents by a corresponding correction coefficient; and deducting a combination of the second, the third, the fourth and the fifth currents from the first current to obtain the UV intensity.

Figure 9:
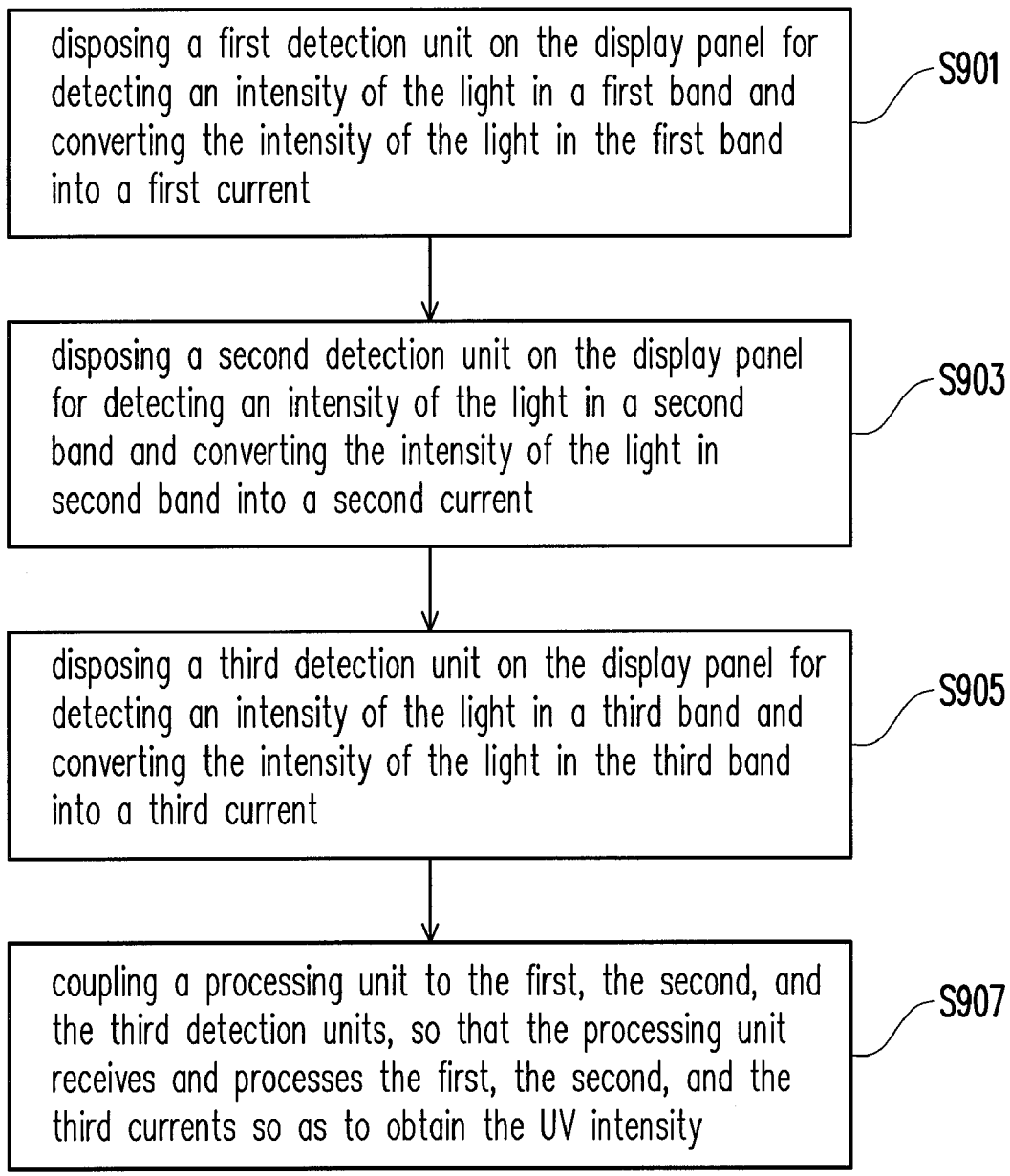
FIG. 9 is a flowchart of a method for fabricating a display apparatus with a display panel to detect an ultraviolet (UV) intensity according to an embodiment of the present invention.

FIG. 9 is a flowchart of a method for fabricating a display apparatus with a display panel to detect an ultraviolet (UV) intensity according to an embodiment of the present invention. Please refer to FIG. 9, the method in the present embodiment includes following steps. Step S901 is disposing a first detection unit on the display panel for detecting an intensity of the light in a first band and converting the intensity of the light in the first band into a first current. Step S903 is disposing a second detection unit on the display panel for detecting an intensity of the light in a second band and converting the intensity of the light in second band into a second current.

Step S905 is disposing a third detection unit on the display panel for detecting an intensity of the light in a third band and converting the intensity of the light in the third band into a third current, wherein the ranges of the second band and the third band are comprised within the range of the first band. The first band, for example, is the light in all band of the sunlight, the second band, for example, is the light in a red band, and the third band, for example, is the light in a band having its wavelength longer than 375 nm (not limited to this value). Step S907 is coupling a processing unit to the first, the second and the third detection units, so that the processing unit receives and processes the first, the second and the third currents so as to obtain the UV intensity.

In the present embodiment, the step of disposing the first detection unit includes disposing a first photo sensor on a lower substrate (for example, an active device array substrate) of the display panel. The step of disposing the second detection unit on the display panel includes disposing a first color resist (for example, a red color resist) on an upper substrate (for example, a color filter substrate) of the display panel; and disposing a second photo sensor corresponding to the first color resist on the lower substrate of the display panel. The step of disposing the third detection unit on the display panel includes disposing a polarizer on the upper substrate of the display panel; and disposing a third photo sensor corresponding to the polarizer on the lower substrate of the display panel.

Figure 10:
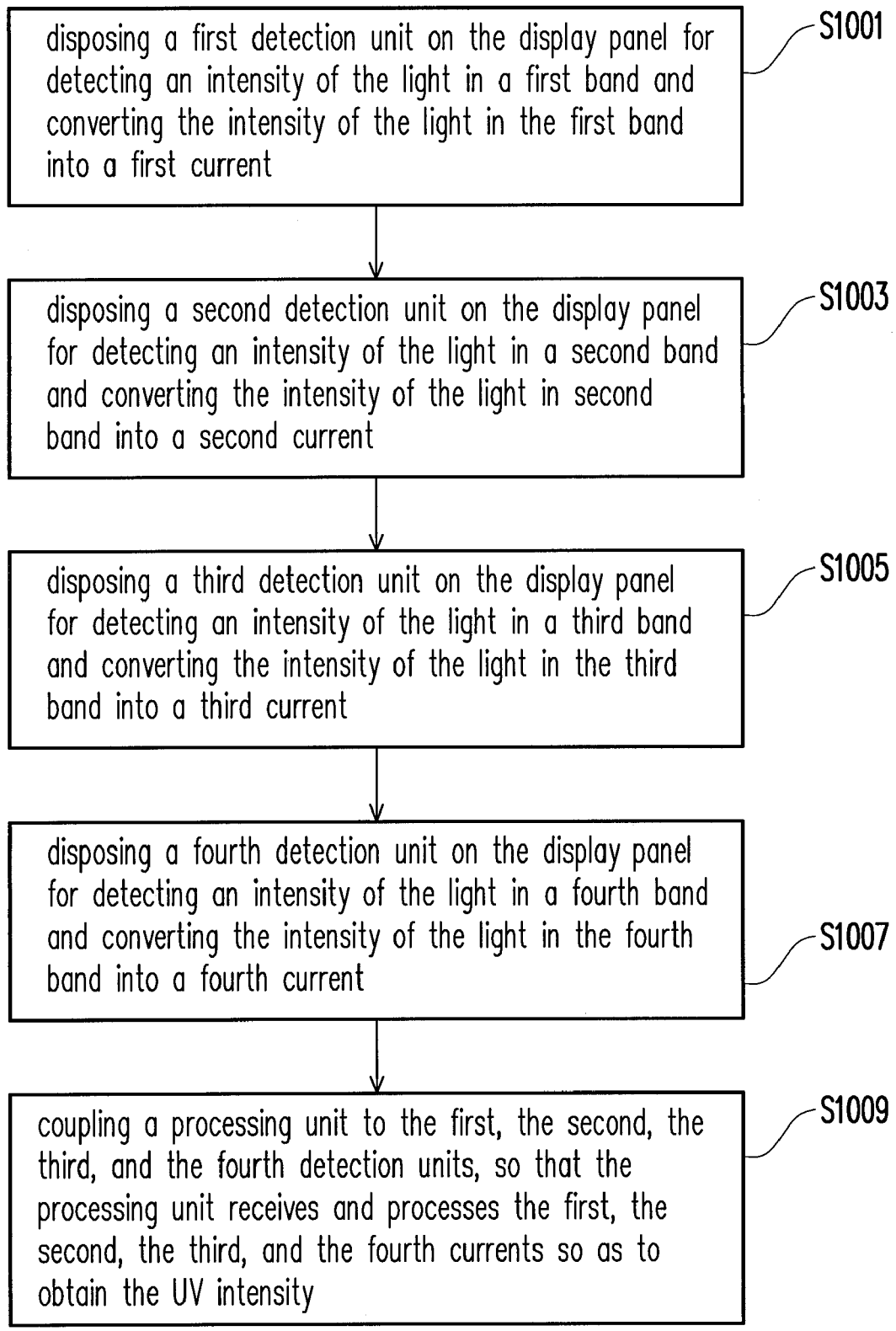
FIG. 10 is a flowchart of a method for fabricating a display apparatus with a display panel to detect an ultraviolet (UV) intensity according to another embodiment of the present invention.

FIG. 10 is a flowchart of a method for fabricating a display apparatus with a display panel to detect an ultraviolet (UV) intensity according to another embodiment of the present invention. Please refer to FIG. 10, the method in the present embodiment includes following steps. Step S1001 is disposing a first detection unit on the display panel for detecting an intensity of the light in a first band and converting the intensity of the light in the first band into a first current. Step S1003 is disposing a second detection unit on the display panel for detecting an intensity of the light in a second band and converting the intensity of the light in second band into a second current.

Step S1005 is disposing a third detection unit on the display panel for detecting an intensity of the light in a third band and converting the intensity of the light in the third band into a third current. Step S1007 is disposing a fourth detection unit on the display panel for detecting an intensity of the light in a fourth band and converting the intensity of the light in the fourth band into a fourth current, wherein the ranges of the second band, the third band and the fourth band are comprised within the range of the first band. The first band, for example, is the light in all band of the sunlight, the second band, for example, is the light in a red band, the third band, for example, is the light in a green band or is the light in a band having its wavelength longer than 375 nm (not limited to this value), and the fourth band, for example, is the light in a blue band.

Step S1009 is coupling a processing unit to the first, the second, the third and the fourth detection units, so that the processing unit receives and processes the first, the second, the third and the fourth currents so as to obtain the UV intensity. In the present embodiment, the step of disposing the first detection unit includes disposing a first photo sensor on a lower substrate (for example, an active device array substrate) of the display panel. The step of disposing the second detection unit on the display panel includes disposing a first color resist (for example, a red color resist) on an upper substrate (for example, a color filter substrate) of the display panel; and disposing a second photo sensor corresponding to the first color resist on the lower substrate of the display panel.

The step of disposing the third detection unit on the display panel includes disposing a polarizer on the upper substrate of the display panel; and disposing a third photo sensor corresponding to the polarizer on the lower substrate of the display panel. The step of disposing the fourth detection unit on the display panel includes disposing a second color resist (for example, a blue color resist) on the upper substrate of the display panel; and disposing a fourth photo sensor corresponding to the second color resist on the lower substrate of the display panel.

On the other hand, in other embodiment of the present invention, the step of disposing the third detection unit on the display panel includes disposing a second color resist (for example, a green color resist) on the upper substrate of the display panel; and disposing a third photo sensor corresponding to the second color resist on the lower substrate of the display panel The step of disposing the fourth detection unit on the display panel includes disposing a third color resist (for example, a blue color resist) on the upper substrate of the display panel; and disposing a fourth photo sensor corresponding to the third color resist on the lower substrate of the display panel.

Figure 11:
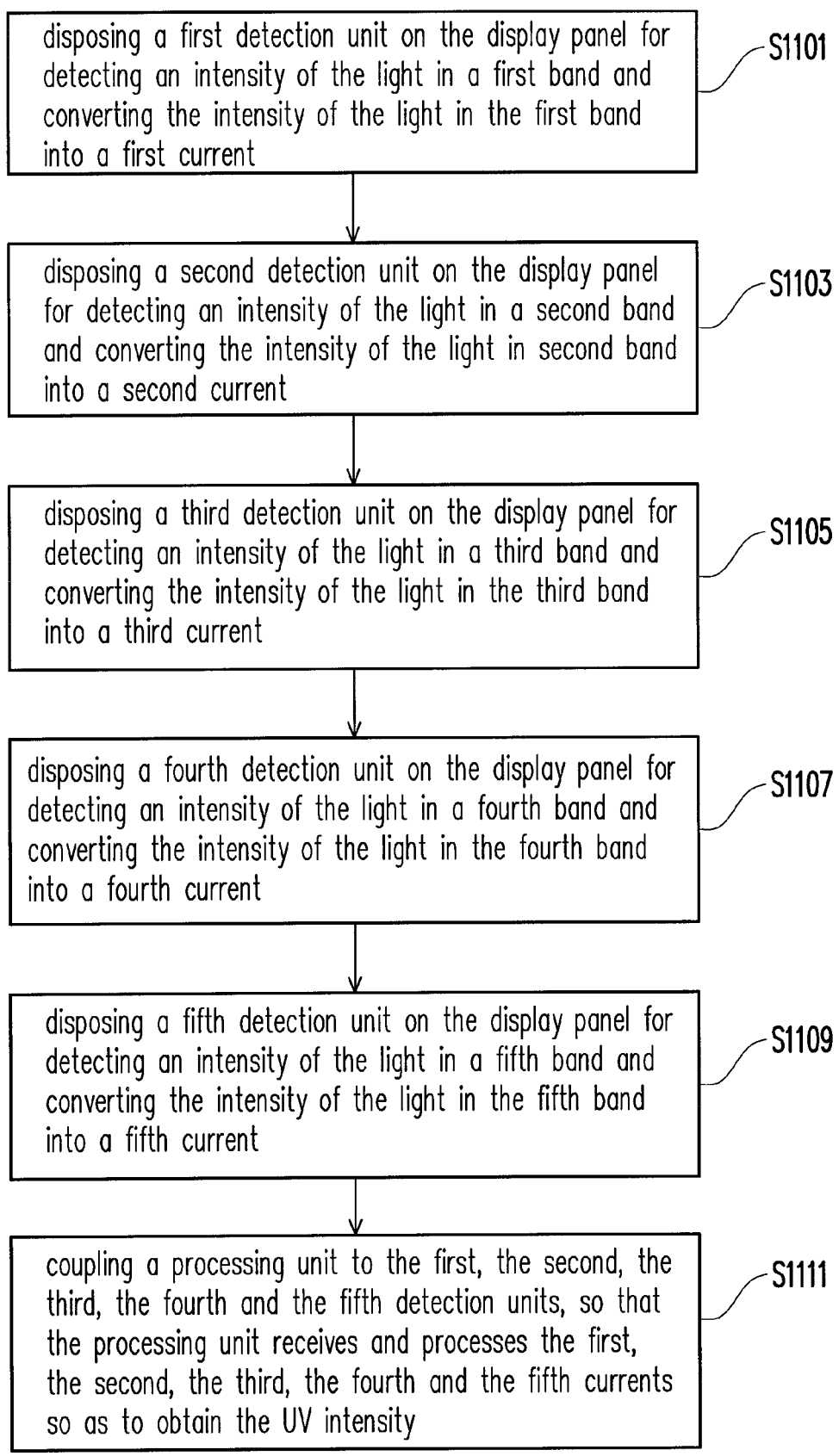
FIG. 11 is a flowchart of a method for fabricating a display apparatus with a display panel to detect an ultraviolet (UV) intensity according to another embodiment of the present invention.

FIG. 11 is a flowchart of a method for fabricating a display apparatus with a display panel to detect an ultraviolet (UV) intensity according to another embodiment of the present invention. Please refer to FIG. 11, the method in the present embodiment includes following steps. Step S1101 is disposing a first detection unit on the display panel for detecting an intensity of the light in a first band and converting the intensity of the light in the first band into a first current. Step S1103 is disposing a second detection unit on the display panel for detecting an intensity of the light in a second band and converting the intensity of the light in second band into a second current.

Step S1105 is disposing a third detection unit on the display panel for detecting an intensity of the light in a third band and converting the intensity of the light in the third band into a third current. Step S1107 is disposing a fourth detection unit on the display panel for detecting an intensity of the light in a fourth band and converting the intensity of the light in the fourth band into a fourth current. Step S1109 is disposing a fifth detection unit on the display panel for detecting an intensity of the light in a fifth band and converting the intensity of the light in the fifth band into a fifth current.

In the present embodiment, the ranges of the second band, the third band, the fourth band and the fifth band are comprised within the range of the first band, and the first band, for example, is the light in all band of the sunlight, the second band, for example, is the light in a red band, the third band, for example, is the light in a band having its wavelength longer than 375 nm (not limited to this value), the fourth band, for example, is the light in a green band, and the fifth band, for example, is the light in a blue band.

Step S1111 is coupling a processing unit to the first, the second, the third, the fourth and the fifth detection units, so that the processing unit receives and processes the first, the second, the third, the fourth and the fifth currents so as to obtain the UV intensity. In the present embodiment, the step of disposing the first detection unit includes disposing a first photo sensor on a lower substrate (for example, an active device array substrate) of the display panel. The step of disposing the second detection unit on the display panel includes disposing a first color resist (for example, a red color resist) on an upper substrate (for example, a color filter substrate) of the display panel; and disposing a second photo sensor corresponding to the first color resist on the lower substrate of the display panel.

The step of disposing the third detection unit on the display panel includes disposing a polarizer on the upper substrate of the display panel; and disposing a third photo sensor corresponding to the polarizer on the lower substrate of the display panel. The step of disposing the fourth detection unit on the display panel includes disposing a second color resist (for example, a green color resist) on the upper substrate of the display panel; and disposing a fourth photo sensor corresponding to the second color resist on the lower substrate of the display panel. The step of disposing the fifth detection unit on the display panel includes disposing a third color resist (for example, a blue color resist) on the upper substrate of the display panel; and disposing a fifth photo sensor corresponding to the third color resist on the lower substrate of the display panel.

In summary, according to the present invention, a display panel is adopted for converting the intensity of the light in all band of the sunlight into a first current and converting the intensity of the light in a plurality of bands having their wavelength longer than 335 nm (i.e., a visible light) also into the other currents. Thus, the processing unit simply deducts the other currents corresponding to the intensity of the light in those bands having their wavelength longer than 335 nm from the first current corresponding to the intensity of the light in all band to obtain the UV intensity (i.e., the UVI) of a UV band (i.e. UVB) having its wavelength shorter than 335 nm.

Moreover, the embodiments described above are only examples about how to implement the present invention but not for restricting the scope of the present invention. In other words, any technique which can be used for detecting the UV intensity by disposing photo sensors on a substrate of a display panel is within the scope of the present invention.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display apparatus for detecting an ultraviolet (UV) intensity, the display apparatus comprising:
   a lower substrate comprising a first photo sensor, a second photo sensor, and a third photo sensor for detecting an intensity of light, from the external of the display apparatus, of a first band, a second band, and a third band and converting the intensity of the light in the first band, the second band, and the third band into a first current, a second current, and a third current respectively;
   an upper substrate disposed opposite to the lower substrate; and
   a processing unit coupled to the first photo sensor, the second photo sensor, and the third photo sensor, for receiving and processing the first current, the second current, and the third current so as to only obtain a UV intensity of a UVB band,
   wherein the ranges of the second band and the third band are comprised within the range of the first band wherein the first band is a band of sunlight, and wherein the second band and the third band are bands of visible light.

2. The display apparatus according to claim 1, wherein the upper substrate comprises a first color resist corresponding to the second photo sensor.

3. The display apparatus according to claim 2, wherein the upper substrate further comprises a polarizer corresponding to the third photo sensor.

4. The display apparatus according to claim 2, wherein the lower substrate further comprises a fourth photo sensor coupled to the processing unit for detecting an intensity of the light of a fourth band and converting the intensity of the light in the fourth band into a fourth current, wherein the range of the fourth band is comprised within the range of the first band.

5. The display apparatus according to claim 4, wherein the upper substrate further comprises:
   a polarizer, corresponding to the third photo sensor; and
   a second color resist, corresponding to the fourth photo sensor.

6. The display apparatus according to claim 4, wherein the upper substrate further comprises:
   a second color resist, corresponding to the third photo sensor; and
   a third color resist, corresponding to the fourth photo sensor.

7. The display apparatus according to claim 2, wherein the lower substrate further comprises: a fourth photo sensor, coupled to the processing unit, for detecting an intensity of the light of a fourth band and converting the intensity of the light in the fourth band into a fourth current; and a fifth photo sensor, coupled to the processing unit, for detecting an intensity of the light of a fifth band and converting the intensity of the light in the fifth band into a fifth current, wherein the ranges of the fourth band and the fifth band are comprised within the range of the first band.

8. The display apparatus according to claim 7, wherein the upper substrate further comprises:
   a polarizer, corresponding to the third photo sensor;
   a second color resist, corresponding to the fourth photo sensor; and
   a third color resist, corresponding to the fifth photo sensor.

9. A method for detecting an ultraviolet (UV) intensity by using a display apparatus with a display panel and a processing unit, the display panel at least comprising a first detection unit, a second detection unit and a third detection unit, the method comprising:
   detecting an intensity of light, from the external of the display apparatus, of a first band and converting the intensity of the light in the first band into a first current by the first detection unit;
   detecting an intensity of the light of a second band and converting the intensity of the light of the second band into a second current by the second detection unit;
   detecting an intensity of the light of a third band and converting the intensity of the light of the third band into a third current by the third detection unit; and
   receiving and processing the first, the second, and the third currents by the processing unit so as to only obtain a UV intensity of a UVB band,
   wherein the ranges of the second band and the third band are comprised within the range of the first band wherein the first band is a band of sunlight, and wherein the second band and the third band are bands of visible light.

10. The method according to claim 9, wherein the step of processing the first, the second, and the third currents comprises:
    respectively multiplying the first, the second, and the third currents by a corresponding correction coefficient; and
    deducting the second and the third currents from the first current to obtain the UV intensity.

11. The method according to claim 9, wherein the display panel further comprises a fourth detection unit, and the method further comprising: detecting an intensity of the light in a fourth band and converting the intensity of the light of the fourth band into a fourth current by the fourth detection unit, wherein the range of the fourth band is comprised within the range of the first band.

12. The method according to claim 11, wherein the display panel further comprises a fifth detection unit, the method further comprising: detecting an intensity of the light in a fifth band and converting the intensity of the light of the fifth band into a fifth current by the fifth detection unit, wherein the range of the fifth band is comprised within the range of the first band.

13. The method according to claim 12, wherein the step of receiving and processing the first, the second, and the third currents by the processing unit further comprises:

receiving and processing the fourth and the fifth currents by the processing unit so as to only obtain the UV intensity of the UVB band.

14. The method according to claim 13, wherein the step of processing the first, the second, the third, the fourth, and the fifth currents comprises:
respectively multiplying the first, the second, the third, the fourth, and the fifth currents by a corresponding correction coefficient; and
deducting a combination of the second, the third, the fourth, and the fifth currents from the first current to obtain the UV intensity.

15. The method according to claim 11, wherein the step of receiving and processing the first, the second, and the third currents by the processing unit further comprises:
receiving and processing the fourth current by the processing unit so as to obtain the UV intensity of the UVB band.

16. The method according to claim 15, wherein the step of processing the first, the second, the third, and the fourth currents comprises:
respectively multiplying the first, the second, the third, and the fourth currents by a corresponding correction coefficient; and
deducting the second, the third, and the fourth currents from the first current to obtain the UV intensity.

17. A method for fabricating a display apparatus with a display panel to detect an ultraviolet (UV) intensity, the method comprising:
disposing a first detection unit on the display panel for detecting an intensity of light, from the external of the display apparatus, of a first band and converting the intensity of the light in the first band into a first current;
disposing a second detection unit on the display panel for detecting an intensity of the light of a second band and converting the intensity of the light in second band into a second current;
disposing a third detection unit on the display panel for detecting an intensity of the light of a third band and converting the intensity of the light of the third band into a third current; and
coupling a processing unit to the first, the second, and the third detection units,
wherein the processing unit receives and processes the first, the second, and the third currents so as to only obtain a UV intensity of a UVB band, and the ranges of the second band and the third band are comprised within the range of the first band wherein the first band is a band of sunlight, and
wherein the second band and the third band are bands of visible light.

18. The method according to claim 17, wherein the step of disposing the first detection unit on the display panel comprises:
disposing a first photo sensor on a lower substrate of the display panel.

19. The method according to claim 18, wherein the step of disposing the second detection unit on the display panel comprises:
disposing a first color resist on an upper substrate of the display panel; and
disposing a second photo sensor corresponding to the first color resist on the lower substrate of the display panel.

20. The method according to claim 19, wherein the step of disposing the third detection unit on the display panel comprises:
disposing a polarizer on the upper substrate of the display panel; and
disposing a third photo sensor corresponding to the polarizer on the lower substrate of the display panel.

21. The method according to claim 19, further comprising:
disposing a fourth detection unit on the display panel for detecting an intensity of the light of a fourth band and converting the intensity of the light of the fourth band into a fourth current; and
coupling a processing unit to the fourth detection units, wherein the processing unit receives and processes the first, the second, the third, and the fourth currents so as to only obtain the UV intensity of the UVB band, and the range of the fourth band is comprised within the range of the first band.

22. The method according to claim 21, wherein the step of disposing the third detection unit on the display panel comprises:
disposing a polarizer on the upper substrate of the display panel; and
disposing a third photo sensor corresponding to the polarizer on the lower substrate of the display panel.

23. The method according to claim 22, wherein the step of disposing the fourth detection unit on the display panel comprises:
disposing a second color resist on the upper substrate of the display panel; and
disposing a fourth photo sensor corresponding to the second color resist on the lower substrate of the display panel.

24. The method according to claim 21, wherein the step of disposing the third detection unit on the display panel comprises:
disposing a second color resist on the upper substrate of the display panel; and
disposing a third photo sensor corresponding to the second color resist on the lower substrate of the display panel.

25. The method according to claim 24, wherein the step of disposing the fourth detection unit on the display panel comprises:
disposing a third color resist on the upper substrate of the display panel; and
disposing a fourth photo sensor corresponding to the third color resist on the lower substrate of the display panel.

26. The method according to claim 19, further comprising:
disposing a fourth detection unit on the display panel for detecting an intensity of the light of a fourth band and converting the intensity of the light of the fourth band into a fourth current;
disposing a fifth detection unit on the display panel for detecting an intensity of the light of a fifth band and converting the intensity of the light of the fifth band into a fifth current; and
coupling the processing unit to the fourth and the fifth detection units, wherein the processing unit receives and processes the first, the second, the third, the fourth, and the fifth currents so as to only obtain the UV intensity of the UVB band, and the fourth band and the fifth band are comprised within the range of the first band.

27. The method according to claim 26, wherein the step of disposing the third detection unit on the display panel comprises:
disposing a polarizer on the upper substrate of the display panel; and
disposing a third photo sensor corresponding to the polarizer on the lower substrate of the display panel.

28. The method according to claim 27, wherein the step of disposing the fourth detection unit on the display panel comprises:
- disposing a second color resist on the upper substrate of the display panel; and
- disposing a fourth photo sensor corresponding to the second color resist on the lower substrate of the display panel.

29. The method according to claim 28, wherein the step of disposing the fifth detection unit on the display panel comprises:
- disposing a third color resist on the upper substrate of the display panel; and
- disposing a fifth photo sensor corresponding to the third color resist on the lower substrate of the display panel.

* * * * *